(12) United States Patent
Christie et al.

(10) Patent No.: US 12,061,477 B2
(45) Date of Patent: Aug. 13, 2024

(54) EXTERNAL ENVIRONMENT SENSOR DATA PRIORITIZATION FOR AUTONOMOUS VEHICLE

(71) Applicant: Aurora Operations, Inc., Mountain View, CA (US)

(72) Inventors: Cameron David Christie, San Francisco, CA (US); Anuranga Sajith Gunaratne, San Francisco, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

(21) Appl. No.: 17/977,396

(22) Filed: Oct. 31, 2022

(65) Prior Publication Data

US 2023/0046691 A1    Feb. 16, 2023

Related U.S. Application Data

(63) Continuation of application No. 16/588,971, filed on Sep. 30, 2019, now Pat. No. 11,550,322.

(51) Int. Cl.
*G05D 1/00* (2024.01)
*G01S 13/931* (2020.01)
(Continued)

(52) U.S. Cl.
CPC .........  *G05D 1/0088* (2013.01); *G05D 1/0238* (2013.01); *G05D 1/0255* (2013.01);
(Continued)

(58) Field of Classification Search
CPC .. G05D 1/0088; G05D 1/0238; G05D 1/0255; G05D 1/0257; G01S 13/931;
(Continued)

(56) References Cited

U.S. PATENT DOCUMENTS 10,331,128 B1 *   6/2019   Hansel ................. H04L 9/3247
10,632,942 B1     4/2020   Christie et al.
(Continued)

OTHER PUBLICATIONS

Buechel, M., "An Automated Electric Vehicle Prototype Showing New Trends in Automotive Architectures," 2015 IEEE, Las Palmas.
(Continued)

*Primary Examiner* — Aniss Chad
*Assistant Examiner* — Stephanie T Su
(74) *Attorney, Agent, or Firm* — Freestone Intellectual Property Law PLLC; Aaron J. Visbeek

(57) ABSTRACT

An autonomous vehicle includes an array of sensors, a processor, and a switch. The array of sensors generate sensor data related to one or more objects in an external environment of the autonomous vehicle and the processor determines an environmental context. The switch transfers the sensor data from the array of sensors to the processor, where the switch is configured to: (a) receive first sensor data from a first sensor group of the array of sensors; (b) receive second sensor data from a second sensor group of the array of sensors; (c) determine an order of transmission of the first sensor data over the second sensor data in response to the environmental context; and (d) transmit the first sensor data to the processor prior to transmitting the second sensor data based on the order of transmission.

18 Claims, 10 Drawing Sheets

(51) Int. Cl.
*G01S 15/931* (2020.01)
*G01S 17/93* (2020.01)
(52) U.S. Cl.
CPC .......... *G05D 1/0257* (2013.01); *G01S 13/931* (2013.01); *G01S 15/931* (2013.01); *G01S 17/93* (2013.01)
(58) Field of Classification Search
CPC ...... G01S 15/931; G01S 17/93; G01S 17/931; G01S 7/53; G01S 13/862; G01S 13/865; G01S 15/86
See application file for complete search history.

(56) References Cited

U.S. PATENT DOCUMENTS

| | | | |
|---|---|---|---|
| 11,550,322 B1 | 1/2023 | Christie et al. | |
| 2013/0088578 A1 | 4/2013 | Umezawa et al. | |
| 2014/0303866 A1 | 10/2014 | Roblin et al. | |
| 2017/0222831 A1 | 8/2017 | Zirkler | |
| 2017/0372149 A1 | 12/2017 | Mori | |
| 2018/0050699 A1 | 2/2018 | Gauthier | |
| 2018/0143633 A1 | 5/2018 | Paryani et al. | |
| 2018/0188027 A1 | 7/2018 | Zhang et al. | |
| 2018/0257643 A1 | 9/2018 | Kroop et al. | |
| 2018/0261020 A1* | 9/2018 | Petousis | G07C 5/0841 |
| 2018/0272963 A1* | 9/2018 | Meyhofer | G01S 17/931 |
| 2019/0050692 A1* | 2/2019 | Sharma | G06F 18/254 |
| 2019/0082016 A1 | 3/2019 | Sasaki et al. | |
| 2019/0122386 A1 | 4/2019 | Wheeler et al. | |
| 2019/0137601 A1 | 5/2019 | Driscoll et al. | |
| 2019/0154842 A1 | 5/2019 | Adachi | |
| 2019/0258251 A1 | 8/2019 | Ditty et al. | |
| 2019/0271559 A1 | 9/2019 | Colgate et al. | |
| 2019/0273909 A1* | 9/2019 | Ye | G06T 7/579 |
| 2020/0201325 A1 | 6/2020 | Parekh et al. | |
| 2020/0356091 A1 | 11/2020 | Nagarajan et al. | |
| 2021/0006344 A1 | 1/2021 | Chen et al. | |
| 2021/0253128 A1 | 8/2021 | Nister et al. | |
| 2022/0048525 A1 | 2/2022 | Tsai et al. | |
| 2022/0067525 A1 | 3/2022 | Sequeira et al. | |
| 2022/0237414 A1 | 7/2022 | Zhang et al. | |
| 2022/0396289 A1 | 12/2022 | Li et al. | |

OTHER PUBLICATIONS

Final Office Action, U.S. Appl. No. 16/588,996, Notification Date: Jan. 24, 2022, 16 pages.
Lee, J., Time-Sensitive Network (TSN) Experiment in Sensor-Based Integrated Environment for Autonomous Driving. Sensors Mar. 2019.
Non-Final Office Action, U.S. Appl. No. 16/588,996, Notification Date: Jul. 23, 2021, 20 pages.
Samii, S., "Level 5 by Layer 2: Time-Sensitive Networking for Autonomous Vehicles," in IEEE Communications Standards Magazine, Jun. 2018.
Wikipedia Contributors. "Time-Sensitive Networking." Wikipedia, The Free Encyclopedia, Nov. 30, 2019. Web. Dec. 17, 2019.
Non-Final Office Action, U.S. Appl. No. 17/536,989, Notification Date: Mar. 20, 2023, 26 pages.

\* cited by examiner

EXTERNAL ENVIRONMENT SENSOR DATA PRIORITIZATION FOR AUTONOMOUS VEHICLE

CROSS-REFERENCE TO RELATED APPLICATIONS

This application is a continuation of U.S. Non-Provisional application Ser. No. 16/588,971 filed Sep. 30, 2019, which is hereby incorporated by reference in its entirety.

TECHNICAL FIELD

This disclosure relates generally to autonomous vehicles and in particular to sensor data prioritization for autonomous vehicles.

BACKGROUND INFORMATION

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). Vehicles with autonomous features utilize sensors to sense the environment that the vehicle navigates through. Acquiring and processing data from the sensors allows the vehicle to safely navigate through its environment.

BRIEF SUMMARY OF THE INVENTION

In implementations of the disclosure, sensor data is received from an array of sensors configured to capture one or more objects in an external environment of an autonomous vehicle. A first sensor group is selected from the array of sensors based on proximity data or environmental contexts. First sensor data from the first sensor group is prioritized for transmission based on the proximity data or environmental contexts.

In an implementation, a method includes receiving sensor data from an array of sensors configured to capture one or more objects in an external environment of an autonomous vehicle and determining a particular object of the external environment from the sensor data. A first sensor group is selected from the array of sensors of the autonomous vehicle based on a proximity of the particular object to the autonomous vehicle. The first sensor group includes at least one sensor positioned to detect the particular object. Based on selecting the first sensor group, a time sensitive network switch prioritizes transmission of first sensor data from the first sensor group over transmission of second sensor data from a second sensor group of the array of sensors, the second sensor group being different from the first sensor group.

The transmission of the first sensor data and the second sensor data is from the time sensitive network switch to the processing logic of the autonomous vehicle and the time sensitive network switch is configured to receive the first sensor data and the second sensor data from the array of sensors, in some implementations.

The method may further include generating, with the processing logic, an external environment representation of the autonomous vehicle with the first sensor data. In some implementations, the first sensor group is on the same side of the autonomous vehicle as the particular object.

The method may further include determining a distance value of the particular object with respect to the autonomous vehicle where the first sensor group is selected based on the distance value. The array of sensors includes at least one of a Light Detection and Ranging (LIDAR) sensor or a Radio Detection and Ranging (RADAR) sensor, in some implementations.

In an implementation, an autonomous vehicle includes an array of sensors, processing logic, and a switch such as a time sensitive network switch. The switch may include a prioritization engine and an output communication port. The array of sensors is configured to capture one or more objects in an external environment of the autonomous vehicle and generate sensor data related to the external environment. The processing logic is configured to determine a particular object of the external environment from the sensor data. The switch is configured to receive the sensor data from the array of sensors. The prioritization engine is configured to prioritize transmission of first sensor data from a first sensor group of the array of sensors over transmission of second sensor data from a second sensor group of the array of sensors. The first sensor data and the second sensor data are prioritized, in time, based on proximity data received by the prioritization engine. The proximity data is representative of a proximity of the particular object to the autonomous vehicle. The output communication port is configured to transmit the first sensor data to the processing logic prior to sending the second sensor data.

In some implementations, the processing logic is configured to generate the proximity data based on the sensor data received from the array of sensors. In some implementations, the proximity data includes a distance value of the particular object with respect to the autonomous vehicle and the first sensor group is selected based on the distance value. In some implementations, the proximity data includes an orientation value of the particular object with respect to the autonomous vehicle and the first sensor group is selected based on the orientation value. The first sensor group is positioned to detect the particular object in a field-of-imaging of the first sensor group, in some implementations. The switch may be a time sensitive network switch. The array of sensors includes at least one of a LIDAR sensor or a RADAR sensor, in some implementations.

In an example implementation, a method includes receiving sensor data from an array of sensors configured to capture one or more objects in an external environment of an autonomous vehicle and determining an environmental context of the autonomous vehicle. The method also includes selecting a first sensor group from the array of sensors of the autonomous vehicle based on the environmental context and based on selecting the first sensor group, prioritizing, by a switch such as a time sensitive network switch, transmission of first sensor data from the first sensor group over transmission of second sensor data from a second sensor group in the array of sensors. The second sensor group is different from the first sensor group.

In some implementations, the transmission of the first sensor data and the second sensor data is from the switch to processing logic of the autonomous vehicle and the switch is configured to receive the first sensor data and the second sensor data from the array of sensors.

In an implementation, the method further includes generating, with the processing logic, an external environment representation of the autonomous vehicle with the first sensor data. The switch may be a time sensitive network switch. In some implementations, the environmental context of the autonomous vehicle includes the entrance of a tunnel and the second sensor group includes RADAR sensors and the first sensor group does not include the RADAR sensors. In some implementations, the environmental context of the autonomous vehicle includes snow conditions and the second sensor group includes LIDAR sensors and the first sensor group does not include the LIDAR sensors. The first sensor group may include a single sensor.

In one illustrative implementation, a bicycle is approaching an autonomous vehicle at very close distance and one or more sensors (in the array of sensors) that are configured for near-field imaging are selected as the first sensor group. Consequently, the first sensor data generated by the first sensor group is prioritized for transmission to the processing logic for processing. Therefore, the data that includes imaging information about an object (e.g. a bicyclist) in very close proximity to the autonomous vehicle is prioritized for processing based on the proximity of the object. In some implementations, the processing logic selects the first sensor group.

In another illustrative implementation, a truck is positioned in front of, and to the right of, the autonomous vehicle and one or more sensors that are best positioned to detect the truck are selected as the first sensor group. Consequently, the first sensor data is prioritized by the time sensitive network switch for transmitting to the processing logic for processing. Hence, data from certain sensors may be prioritized for processing by the time sensitive network switch based on the orientation of the sensor(s) and their corresponding position to detect the particular object in a field-of-imaging of the sensors.

In one illustrative implementation, an autonomous vehicle is in a snowy environmental context and certain sensors of the autonomous vehicle are better configured to detect an external environment of the autonomous vehicle in a snowy environmental context. In one implementation, an autonomous vehicle includes LIDAR and RADAR sensors and the RADAR sensor(s) are selected as the first sensor group since RADAR imaging may be of better quality than LIDAR imaging with snow falling. Consequently, first sensor data (RADAR sensor data) is prioritized for transmission for processing over the second sensor data generated by LIDAR sensors.

In another illustrative implementation, an autonomous vehicle enters a tunnel and certain sensors of the autonomous vehicle are better configured to detect a tunnel environment. In one implementation, an autonomous vehicle includes LIDAR and RADAR sensors and the LIDAR sensor(s) are selected as the first sensor group since RADAR signals reflecting off tunnel surfaces may offer less imaging value than LIDAR imaging. Consequently, first sensor data (LIDAR sensor data) may be prioritized for transmission for processing over the second sensor data generated by RADAR sensors.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1A:
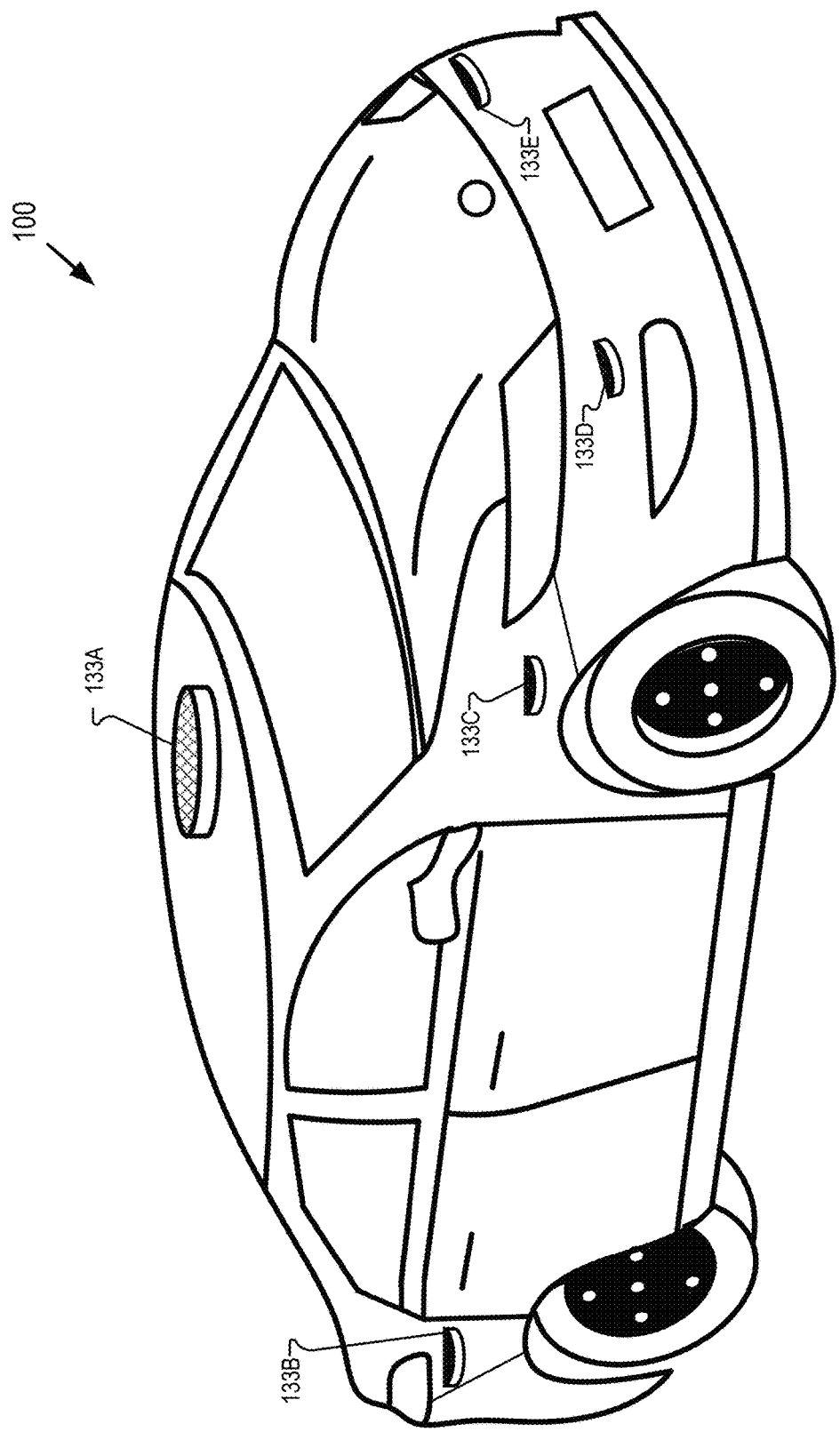
FIG. 1A illustrates an autonomous vehicle including an array of example sensors, in accordance with aspects of the disclosure.

Implementations of an autonomous vehicle and a system for an autonomous vehicle are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

This disclosure includes implementations of an autonomous vehicle including a plurality of sensors and prioritizing sensor data based on an external environment of the autonomous vehicle. Example sensors that may be used in autonomous vehicles includes camera systems, Radio Detection and Ranging (RADAR) systems, (Light Detection and Ranging) LIDAR systems, 3D positioning sensors including Global Positioning System (GPS) Sensors, and Inertial Measurement Units (IMU). The sensors may be positioned in different locations of the autonomous vehicle and different sensor modalities may be better configured to sense or detect objects in different environmental contexts, different orientations to the autonomous vehicle, or different distances from the autonomous vehicle, for example.

In implementations of the disclosure, sensor data from an array of sensors in an autonomous vehicle is received and an object is determined from the sensor data. A time sensitive network switch may be configured to receive the sensor data from the array of sensors. Based on the proximity of the object, first sensor data from a first sensor group is prioritized over second sensor data from a second sensor group and the first data is transmitted by the time sensitive network switch for processing prior to the second data being transmitted for processing.

In one example, a bicyclist is approaching an autonomous vehicle at very close distance and one or more sensors (in the array of sensors) that are configured for near-field imaging are selected as the first sensor group. Consequently, the first sensor data generated by the first sensor group is prioritized for transmission to processing logic for processing. Therefore, the data that includes imaging information about an object (e.g. a bicycle) in very close proximity to the autonomous vehicle is prioritized for processing based on the proximity of the object.

In another example, a truck is positioned in front of, and to the right of, the autonomous vehicle and one or more sensors that are best positioned to detect the truck are selected as the first sensor group. Consequently, the first sensor data is prioritized by the time sensitive network switch for transmitting to processing logic for processing. Hence, data from certain sensors may be prioritized for processing based on the orientation of the sensor(s) and their corresponding position to image or detect the particular object in a field-of-imaging of the sensors.

In implementations of the disclosure, sensor data from an array of sensors in an autonomous vehicle is prioritized based on an environmental context of an external environment of an autonomous vehicle. A time sensitive network switch may be configured to receive the sensor data from the array of sensors. Based on an environmental context (e.g. rain, fog, snow, tunnel), first sensor data from a first sensor group is prioritized over second sensor data from a second sensor group and the first data is transmitted by the time sensitive network switch for processing prior to the second data being transmitted for processing.

In one example, an autonomous vehicle is in a snowy environmental context and certain sensors of the autonomous vehicle are better configured to detect an external environment of the autonomous vehicle in a snowy environmental context. In one example, an autonomous vehicle includes LIDAR and RADAR sensors and the RADAR sensor(s) are selected as the first sensor group since RADAR imaging may be of better quality than LIDAR imaging with snow falling. Consequently, first sensor data (RADAR sensor data) is prioritized for transmission for processing over the second sensor data generated by LIDAR sensors.

In another example, an autonomous vehicle enters a tunnel and certain sensors of the autonomous vehicle are better configured to detect a tunnel environment. In one example, an autonomous vehicle includes LIDAR and RADAR sensors and the LIDAR sensor(s) are selected as the first sensor group since RADAR signals reflecting off tunnel surfaces may offer less imaging value than LIDAR imaging. Consequently, first sensor data (LIDAR sensor data) may be prioritized for transmission for processing over the second sensor data generated by RADAR sensors. These and other implementations will be discussed with respect to FIGS. 1A-8 in greater detail below.

Figure 1B:
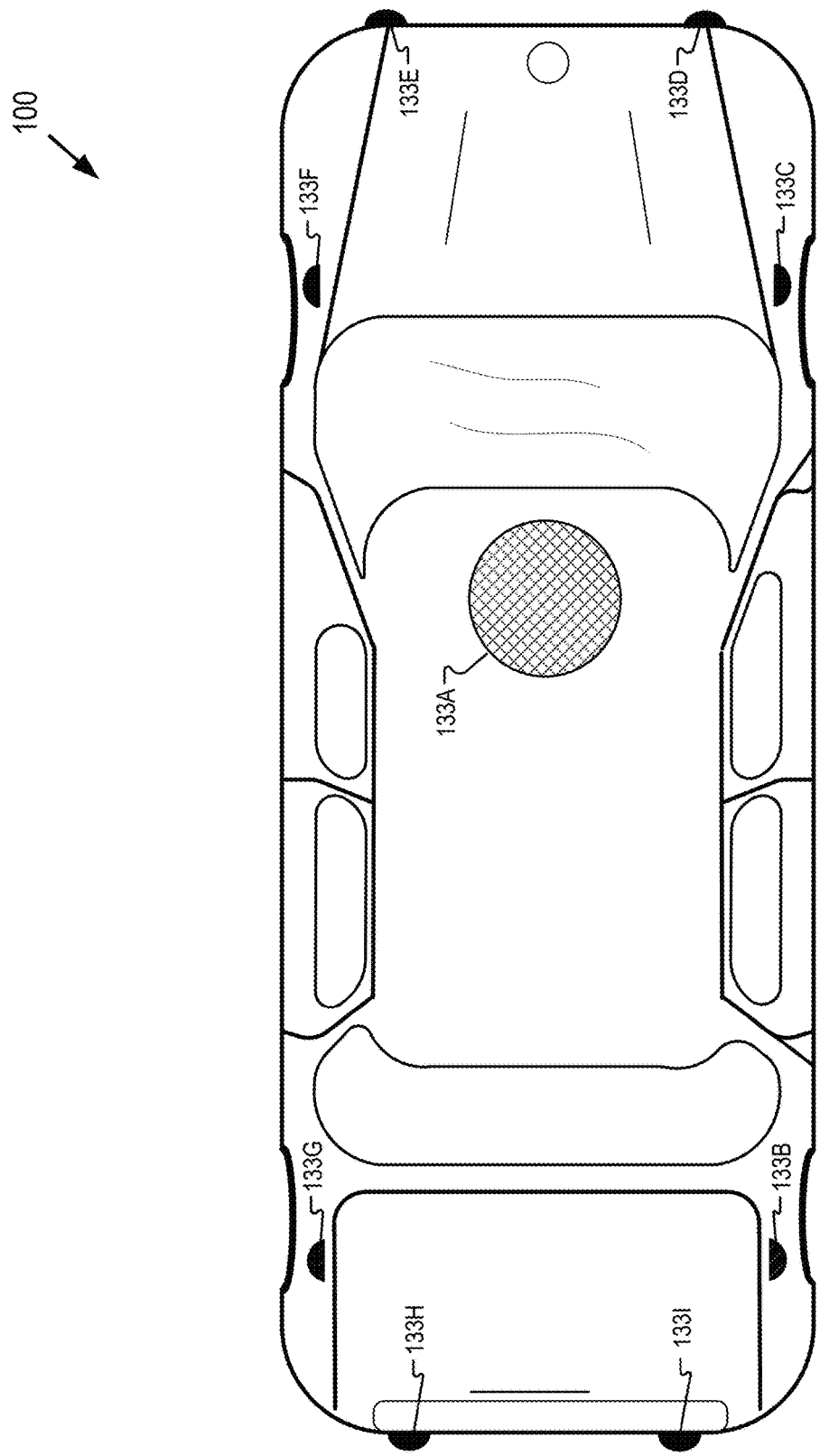
FIG. 1B illustrates a top view of an autonomous vehicle including an array of example sensors, in accordance with aspects of the disclosure.
Figure 1C:
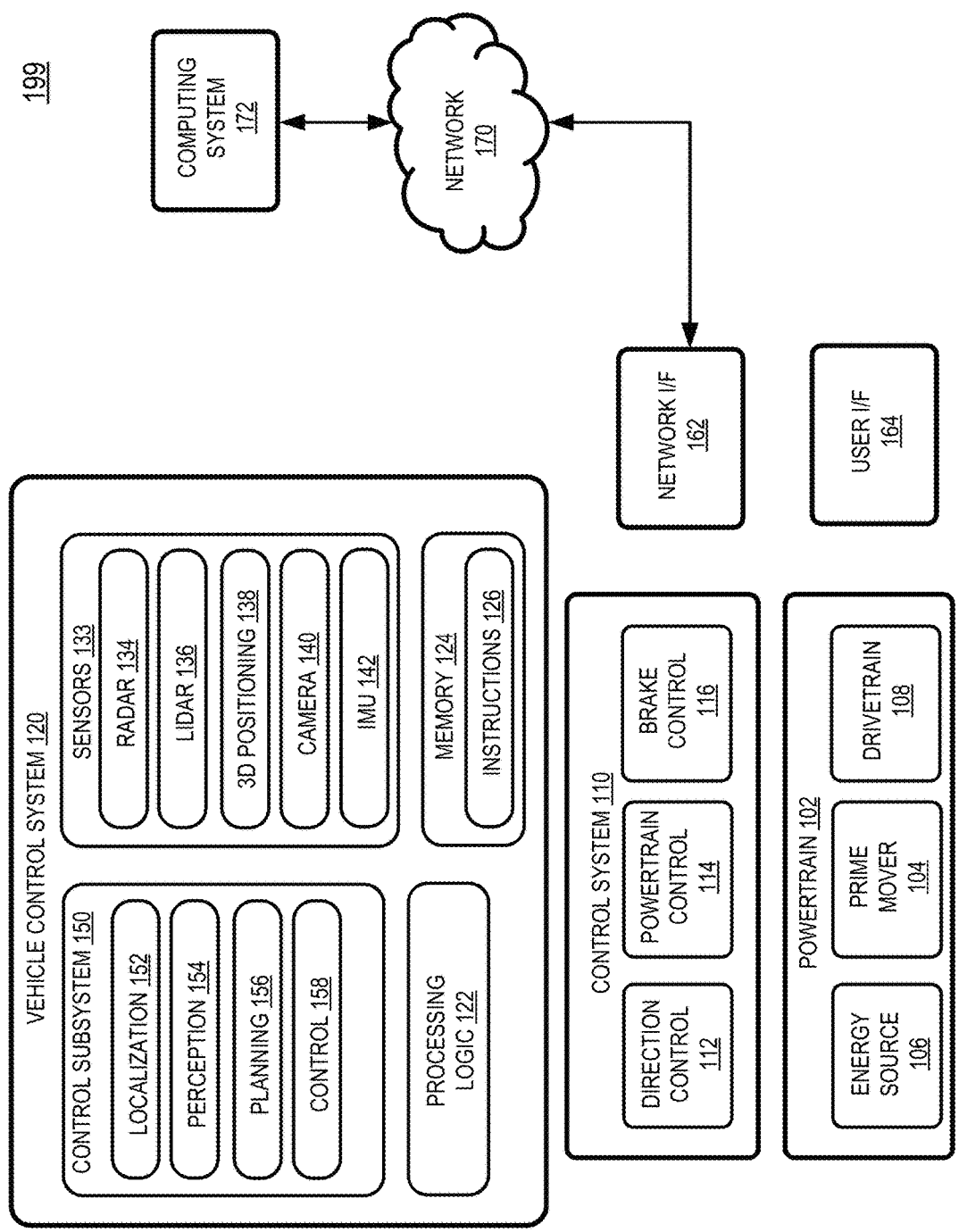
FIG. 1C illustrates an example vehicle control system including sensors, a drivetrain, and a control system, in accordance with aspects of the disclosure.

FIG. 1A illustrates an example autonomous vehicle 100 that includes an array of sensors, in accordance with aspects of the disclosure. The illustrated autonomous vehicle 100 includes an array of sensors configured to capture one or more objects in an external environment of the autonomous vehicle and to generate sensor data related to the captured one or more objects for purposes of controlling the operation of autonomous vehicle 100. FIG. 1A shows sensor 133A, 133B, 133C, 133D, and 133E. FIG. 1B illustrates a top view of autonomous vehicle 100 including sensors 133F, 133G, 133H, and 133I in addition to sensors 133A, 133B, 133C, 133D, and 133E. FIG. 1C illustrates a block diagram 199 of an example system for autonomous vehicle 100. For example, autonomous vehicle 100 may include powertrain 102 including prime mover 104 powered by energy source 106 and capable of providing power to drivetrain 108. Autonomous vehicle 100 may further include control system 110 that includes direction control 112, powertrain control 114, and brake control 116. Autonomous vehicle 100 may be implemented as any number of different vehicles, including vehicles capable of transporting people, including vehicles capable of transporting people and/or cargo, and capable of traveling in a variety of different environments. It will be appreciated that the aforementioned components 102-116 can vary widely based upon the type of vehicle within which these components are utilized.

The implementations discussed hereinafter, for example, will focus on a wheeled land vehicle such as a car, van, truck, or bus. In such implementations, prime mover 104 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow the autonomous vehicle 100 and direction or steering components suitable for controlling the trajectory of the autonomous vehicle 100 (e.g., a rack and pinion steering linkage enabling one or more wheels of autonomous vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 112 may include one or more actuators and/or sensors for controlling and receiving feedback from the direction or steering components to enable the autonomous vehicle 100 to follow a desired trajectory. Powertrain control 114 may be configured to control the output of powertrain 102, e.g., to control the output power of prime mover 104, to control a gear of a transmission in drivetrain 108, thereby controlling a speed and/or direction of the autonomous vehicle 100. Brake control 116 may be configured to control one or more brakes that slow or stop autonomous vehicle 100, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 100 is implemented in vehicle control system 120, which may include one or more processors in processing logic 122 and one or more memories 124, with processing logic 122 configured to execute program code (e.g. instructions 126) stored in memory 124. Processing logic 122 may include graphics processing unit(s) (GPUs) and/or central processing unit(s) (CPUs), for example.

Sensors 133A-133I may include various sensors suitable for collecting data from an autonomous vehicle's surrounding environment for use in controlling the operation of the autonomous vehicle. For example, sensors 133A-133I can include RADAR unit 134, LIDAR unit 136, 3D positioning sensor(s) 138, e.g., a satellite navigation system such as GPS, GLONASS, BeiDou, Galileo, or Compass. In some implementations, 3D positioning sensor(s) 138 can determine the location of the vehicle on the Earth using satellite signals. Sensors 133A-133I can optionally include one or more cameras 140 and/or an Inertial Measurement Unit (IMU) 142. In some implementations, camera 140 can be a monographic or stereographic camera and can record still and/or video images. Camera 140 may include a Complementary Metal-Oxide-Semiconductor (CMOS) image sensor configured to capture images of one or more objects in an external environment of autonomous vehicle 100. IMU 142 can include multiple gyroscopes and accelerometers capable of detecting linear and rotational motion of autonomous vehicle 100 in three directions. One or more encoders (not illustrated) such as wheel encoders may be used to monitor the rotation of one or more wheels of autonomous vehicle 100.

The outputs of sensors 133A-133I may be provided to control subsystems 150, including, localization subsystem 152, planning subsystem 156, perception subsystem 154, and control subsystem 158. Localization subsystem 152 is configured to determine the location and orientation (also sometimes referred to as the "pose") of autonomous vehicle 100 within its surrounding environment, and generally within a particular geographic area. The location of an autonomous vehicle can be compared with the location of an additional vehicle in the same environment as part of generating labeled autonomous vehicle data. Perception subsystem 154 is configured to detect, track, classify, and/or determine objects within the environment surrounding autonomous vehicle 100. Planning subsystem 156 is configured to generate a trajectory for autonomous vehicle 100 over a particular timeframe given a desired destination as well as the static and moving objects within the environment. A machine learning model in accordance with several implementations can be utilized in generating a vehicle trajectory. Control subsystem 158 is configured to operate control system 110 in order to implement the trajectory of the autonomous vehicle 100. In some implementations, a machine learning model can be utilized to control an autonomous vehicle to implement the planned trajectory.

It will be appreciated that the collection of components illustrated in FIG. 1C for vehicle control system 120 is merely exemplary in nature. Individual sensors may be omitted in some implementations. In some implementations, different types of sensors illustrated in FIG. 1C may be used for redundancy and/or for covering different regions in an environment surrounding an autonomous vehicle. In some implementations, different types and/or combinations of control subsystems may be used. Further, while subsystems 152-158 are illustrated as being separate from processing logic 122 and memory 124, it will be appreciated that in some implementations, some or all of the functionality of subsystems 152-158 may be implemented with program code such as instructions 126 resident in memory 124 and executed by processing logic 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, autonomous vehicle 100 may also include a secondary vehicle control system (not illustrated), which may be used as a redundant or backup control system for autonomous vehicle 100. In some implementations, the secondary vehicle control system may be capable of operating autonomous vehicle 100 in response to a particular event. The secondary vehicle control system may only have limited functionality in response to the particular event detected in primary vehicle control system 120. In still other implementations, the secondary vehicle control system may be omitted.

In some implementations, different architectures, including various combinations of software, hardware, circuit logic, sensors, and networks. may be used to implement the various components illustrated in FIG. 1C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 100, e.g., any cache memory in a processor, as well as any storage capacity used as a virtual memory, e.g., as stored on a mass storage device or another computer controller. Processing logic 122 illustrated in FIG. 1C, or entirely separate processing logic, may be used to implement additional functionality in autonomous vehicle 100 outside of the purposes of autonomous control, e.g., to control entertainment systems, to operate doors, lights, or convenience features.

In addition, for additional storage, autonomous vehicle 100 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 100 may include a user interface 164 to enable autonomous vehicle 100 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which autonomous vehicle 100 receives environmental and other data for use in autonomous control thereof. In some implementations, data collected by one or more sensors 133A-133I can be uploaded to computing system 172 through network 170 for additional processing. In such implementations, a time stamp can be associated with each instance of vehicle data prior to uploading.

Processing logic 122 illustrated in FIG. 1C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 100 through network 170, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 1C is not intended to limit implementations disclosed herein. Indeed, those skilled in the art will recognize that other alternative hardware and/or software environments may be used without departing from the scope of implementations disclosed herein.

Figure 2:
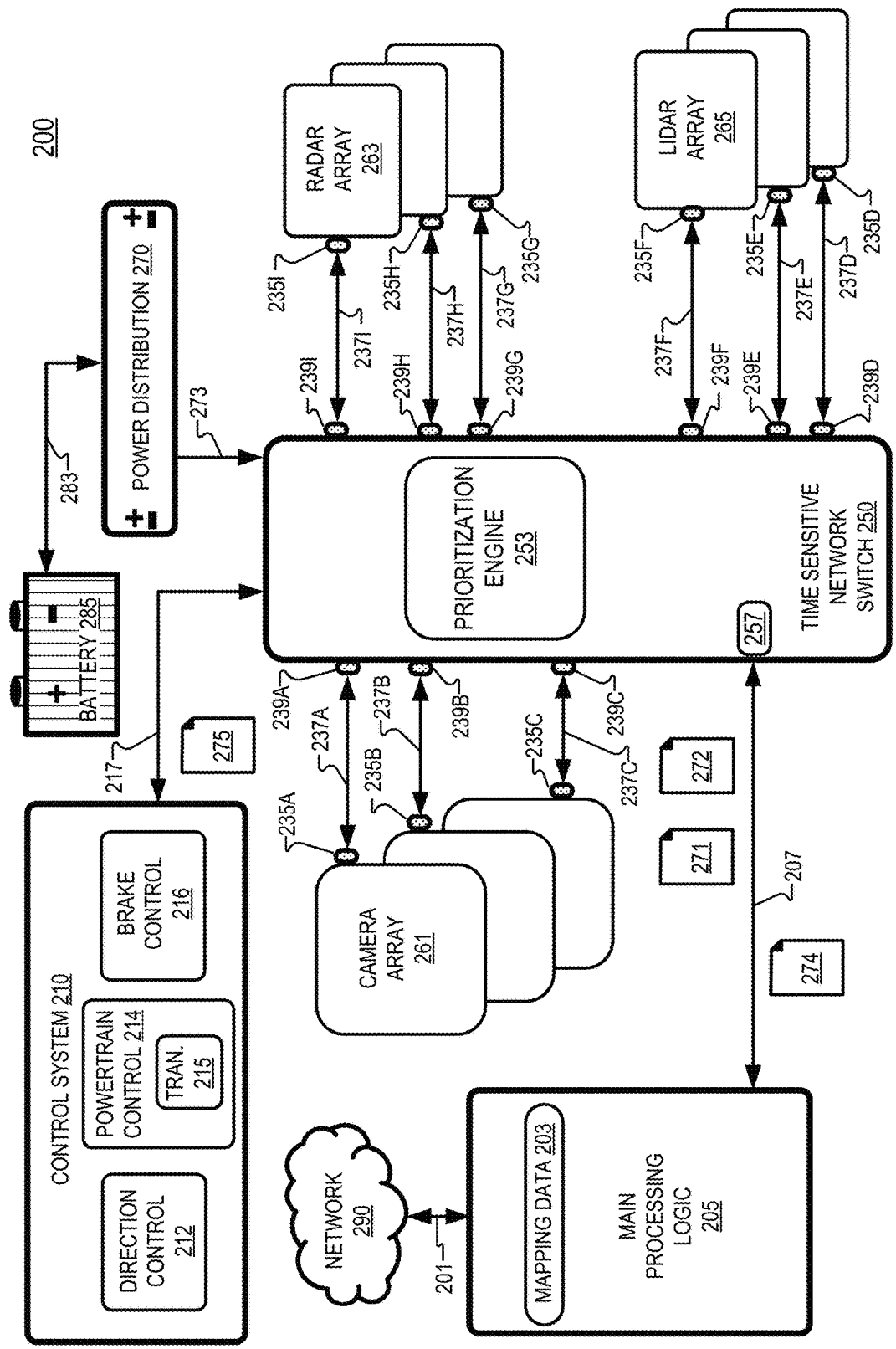
FIG. 2 illustrates a block diagram of an example system that may be included in a vehicle, in accordance with aspects of the disclosure.

FIG. 2 illustrates a block diagram of example system 200 that may be included in an autonomous vehicle, in accordance with aspects of the disclosure. System 200 includes main processing logic 205, time sensitive network switch 250, power distribution module 270, vehicle battery 285, network 290, cameras array 261, RADAR sensor array 263, and LIDAR sensor array 265. Sensors in addition to camera array 261, RADAR sensor array 263, and LIDAR sensor array 265 may also be included in system 200. Vehicle battery 285 may be a main vehicle battery for a vehicle such as autonomous vehicle 100 for operating the vehicle electrical subsystems. Vehicle battery 285 may provide a voltage of 12-14 VDC, for example. Vehicle battery 285 is configured to provide electrical power to power distribution module 270 through battery interface 283, in FIG. 2. Power distribution module 270 may be configured to convert the vehicle battery voltage provided by vehicle battery 285 to an elevated voltage and provide the elevated voltage to time sensitive network switch 250 through elevated voltage interface 273. Power distribution module 270 may include power converters and/or power regulators (e.g. switching power supplies) configured to convert the vehicle battery voltage to an elevated voltage.

In addition to receiving the elevated voltage from power distribution module 270, time sensitive network switch 250 is configured to send and receive data. In autonomous vehicles, high-speed data transfer for data that impacts vehicle operation is critical. Time sensitive network switch 250 is communicatively coupled to main processing logic 205 through high-speed data interface 207. High-speed data interface 207 may be one or more 10 Gigabit per second (Gb/s) connections. In an implementation, main processing logic 205 is communicatively coupled to time sensitive network switch 250 through two 10 Gb/s connections of high-speed data interface 207.

Main processing logic 205 may be a processing board including a plurality of multi-core processors and a plurality of memory devices. The processing board may also include communication interfaces and be coupled to a heat-sink or be cooled by a fan system. Main processing logic 205 may process the sensor data received from time sensitive network switch 250 to determine objects in an external environment of an autonomous vehicle and operate the vehicle based at least in part on the determination. "Objects" may include inanimate objects such as obstacles, barriers, building, other vehicles, poles, and/or signs, for example. Objects may, in some implementations, refer additionally to actors on the road such as pedestrians and bicyclists. In some implementations, main processing logic 205 accesses mapping data 203 in addition to processing the sensor data received from time sensitive network switch 250 to determine operation instructions for operating the autonomous vehicle. Mapping data 203 may have been collected by vehicles other than the vehicle that is collecting the sensor data. Mapping data 203 may include positions of static bodies (e.g. buildings, barriers, streets) in an external environment of an autonomous vehicle. Mapping data 203 may be provided to main processing logic 205 from network 290 through interface 201. In some implementations, interface 201 is a wireless protocol such as IEEE 802.11 protocols or cellular data protocols (e.g. 3G, 4G, LTE, 5G). Mapping data 203 may be updated by a plurality of vehicles and periodically or continually updated by main processing logic 205 by downloading the updated mapping data from network 290.

Time sensitive network switch 250 is individually coupled to a plurality of sensors by way of a data-power interface, in FIG. 2. In the particular illustration of FIG. 2, time sensitive network switch 250 is individually coupled to each camera in camera array 261 through data-power interfaces 237A, 237B, and 237C. That is, each camera in camera array 261 has a connector (e.g. connectors 235A-235C) coupled to a connector (e.g. connectors 239A-239C) of time sensitive network switch 250 through its own data-power interface (e.g. data-power interface 237A-237C). In the illustrated implementation of FIG. 2, connector 235A is coupled to connector 239A through data-power interface 237A, connector 237B is coupled to connector 239B through data-power interface 237B, and connector 237C is coupled to connector 239C through data-power interface 237C. Similarly, time sensitive network switch 250 is individually coupled to each RADAR sensor in RADAR sensor array 263 through data-power interfaces 237G, 237H, and 237I. That is, each RADAR sensor in RADAR sensor array 263 has a connector (e.g. connectors 235G-235I) coupled to a connector (e.g. connectors 239G-239I) of time sensitive network switch 250 through its own data-power interface (e.g. data-power interface 237G-237I). In the illustrated implementation of FIG. 2, connector 235G is coupled to connector 239G through data-power interface 237G, connector 235H is coupled to connector 239H through data-power interface 237H, and connector 235I is coupled to connector 239I through data-power interface 237I. FIG. 2 also illustrates that time sensitive network switch 250 is individually coupled to each LIDAR sensor in LIDAR sensor array 265 through data-power interfaces 237D, 237E, and 237F. That is, each LIDAR sensor in LIDAR sensor array 265 has a connector (e.g. connectors 235D-235F) coupled to a connector (e.g. connectors 239D-239F) of time sensitive network switch 250 through its own data-power interface (e.g. data-power interface 237D-237F). In the illustrated implementation of FIG. 2, connector 235D is coupled to connector 239D through data-power interface 237D, connector 235E is coupled to connector 239E through data-power interface 237E, and connector 235F is coupled to connector 239F through data-power interface 237F. In these implementations, the cameras, RADAR sensors, and LIDAR sensor are merely examples of sensors that can be implemented as sensors of an autonomous vehicle that may be coupled to time sensitive network switch 250 through a data-power interface (e.g., data-power interface 237A-237I). Consequently, the data-power interface may separately couple any sensors that are utilized in different implementations to time sensitive network switch 250 where time sensitive network switch 250 includes a separate connector for the data-power interface of each sensor in the array of sensors.

In the illustrated implementation, main processing logic 205 may determine an operation instruction based at least in part on the received sensor data. Main processing logic 205 may then send that operation instruction to control system 210 by way of high-speed data interface 207, time-sensitive switch 250, and control interface 217. Control interface 217 is communicatively coupled between time-sensitive switch 250 and control system 210. Control interface 217 may be one or more 10 Gb/s connections. Control system 210 includes direction control 212, powertrain control 214, and brake control 216, which may be configured similarly to direction control 112, powertrain control 114, and brake control 116 illustrated in FIG. 1C. Therefore, operation instructions generated by main processing logic 205 may be generated based on mapping data 203 and the sensor data received from time-sensitive switch 250. Once main processing logic 205 generates the operation instruction(s), the operations instruction(s) may be sent to control system 210 via time-sensitive switch 250.

A data-power interface (e.g., data-power interface 237A-237I) includes at least one high-speed vehicle communication link and may also provide an elevated voltage to each sensor to power the sensor. The high-speed vehicle communication link may be defined as more than 100 Megabits per second (Mb/s), in some implementations.

Time sensitive network switch 250 is configured to receive sensor data from any of the sensors in the array of sensors that are coupled to time sensitive network switch 250 through data-power interface (e.g., data-power interface 237A-237I). Time sensitive network switch 250 is "time sensitive" because it can reduce delay to transfer the received sensor data to main processing logic 205 so that main processing logic 205 can utilize the sensor data to operate the autonomous vehicle to be responsive to objects that are detected by the sensors. Time sensitive network switch 250 may time-stamp received sensor data before forwarding the sensor data to main processing logic 205. Time sensitive network switch 250 may include a plurality of multi-core processors. Time sensitive network switch 250 includes prioritization engine 253 to prioritize the transmission of selected sensor data through data-power interface 257, in FIG. 2. For example, prioritization engine 253 may prioritize the transmission of first sensor data from particular sensors over the transmission of second sensor data from different sensors based on an environmental context of an external environment of the autonomous vehicle. In another example, prioritization engine 253 may prioritize the transmission of RADAR sensor data from RADAR sensor array 263 over the transmission of LIDAR sensor data from LIDAR sensor array 265 based on received proximity data representative of the proximity of a particular object to the autonomous vehicle. An environmental context may include conditions of the road and/or an environment surrounding the autonomous vehicle at any given point in time.

Data-power interface 257 may include an input communication port and an output communication port. The output communication port is configured to transmit sensor data such as first sensor data 271 and second sensor data 272 to main processing logic 205 and the input communication port is configured to receive data such as prioritization message 274 from main processing logic 205.

Figure 3:
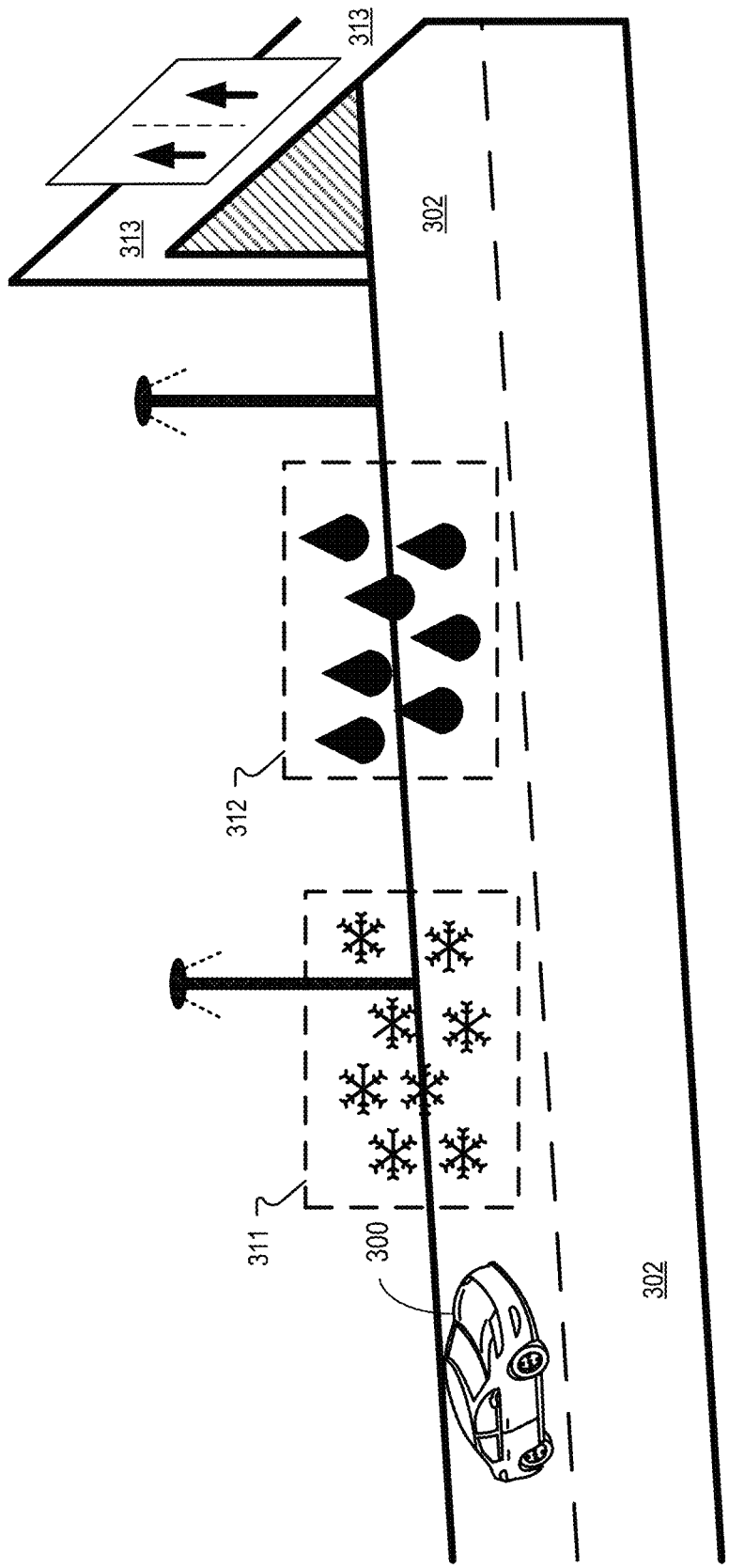
FIG. 3 illustrates an autonomous vehicle encountering different environmental contexts while navigating a roadway, in accordance with aspects of the disclosure.

FIG. 3 illustrates autonomous vehicle 300 encountering different environmental contexts while navigating roadway 302, in accordance with aspects of the disclosure. In some implementations, the environmental context of the autonomous vehicle may be represented using weather parameters. For example, the weather parameters can represent snow conditions, or rain conditions. Autonomous vehicle 300 may encounter snow conditions environmental context 311 where snow, sleet, hail, or other form of frozen or semi-frozen precipitation is falling on autonomous vehicle 300. Autonomous vehicle 300 may determine snow conditions environmental context 311 through imaging processing of images captured by cameras (e.g. camera array 261) of autonomous vehicle 300. Autonomous vehicle 300 may also determine snow conditions environmental context 311 by way of temperature gauges or precipitation sensors of autonomous vehicle 300. In some implementations, referring back to FIG. 2, main processing logic 205 may determine the environmental context and send a prioritization message 274 to prioritization engine 253 that instructs prioritization engine 253 which sensors (and corresponding sensor data) to prioritize.

With reference to FIG. 3, in snow conditions environmental context 311, certain sensor categories may provide better imaging of the external environment than other sensors. For example, RADAR sensor data may be more useful than LIDAR sensor data or camera sensor data due to visibility constraints for the camera and reflections off the snow (or other frozen or semi-frozen precipitation) of infrared illumination light used in LIDAR imaging. Hence, in an implementation, a first sensor group (e.g. RADAR sensors) may be selected from an array of sensors based on a determined environmental context. Based on selecting the first sensor group, a time sensitive network switch may prioritize the transmission of the first sensor data from the first sensor group over transmission of second sensor data from a second sensor group in the array of sensors. The second sensor group may be the remainder of the non-selected sensors in the array of sensors, in some implementations. For example, if the RADAR sensor(s) are the selected first sensor group, the second sensor group may include the LIDAR sensors, the cameras, and/or other sensors (e.g. ultrasonic sensors). In some implementations, a time sensitive network switch can prioritize the transmission of sensor data in multiple levels. For example, a time sensitive network switch can prioritize the transmission of sensor data from a first sensor group, then allow the transmission of sensor data from a second sensor group, and then allow the transmission of sensor data from a third sensor group.

In some implementations, a time sensitive network switch can prioritize the transmission of sensor data within a group of sensors. For example, where an array of sensors includes multiple LIDAR sensors, a time sensitive network switch can prioritize the transmission of sensor data from a particular LIDAR sensor over transmission of sensor data from LIDAR sensors other than the particular LIDAR sensor. In some implementations, a time sensitive network switch can prioritize the transmission of sensor data in multiple levels. For example, where an array of sensors includes multiple LIDAR sensors, a time sensitive network switch can prioritize the transmission of sensor data from a first LIDAR sensor, then allow the transmission of sensor data from a second LIDAR sensor, and then allow the transmission of sensor data from a third LIDAR sensor.

FIG. 3 illustrates that autonomous vehicle 300 may also encounter another environmental context 312. Environmental context 312 may include rain conditions, fog conditions, or otherwise and certain sensors of the autonomous vehicle 300 may perform better in environmental context 312. And, sensors that perform better in environmental context 312 may be prioritized.

FIG. 3 also illustrates that autonomous vehicle 300 may enter tunnel 313 as another environmental context. When autonomous vehicle 300 enters a tunnel or even a constrained roadway having close barriers but not necessarily a closed ceiling, certain sensors may provide more useful imaging data. In the context of a tunnel, RADAR sensors may provide less useful imaging since RADAR signals reflected off of tunnels or close barriers are less reliable than in more open driving contexts. Hence, LIDAR sensor data from LIDAR sensors may be prioritized over RADAR sensor data.

In some implementations, autonomous vehicle 300 may determine a tunnel environmental context (i.e., whether autonomous vehicle 300 is or will be located in tunnel 313) through processing various sensor data. For example, autonomous vehicle 300 can determine the tunnel environmental context through processing (i) images captured by cameras (e.g. camera array 261 in FIG. 2), (ii) cloud points provided from LIDAR sensors, (iii) cloud points provided from RADAR sensors, or (iv) a combination thereof. In some implementations, autonomous vehicle 300 may determine the tunnel environmental context by matching a GPS position of autonomous vehicle 300 with a known tunnel position on a digital map. In these implementations, the GPS data can be combined with the sensor data to determine the tunnel environmental context. In some implementations, referring back to FIG. 2, main processing logic 205 may determine the tunnel environmental context and send prioritization message 274 to prioritization engine 253 that instructs prioritization engine 253 which sensors (and corresponding sensor data) to prioritize.

Figure 4:
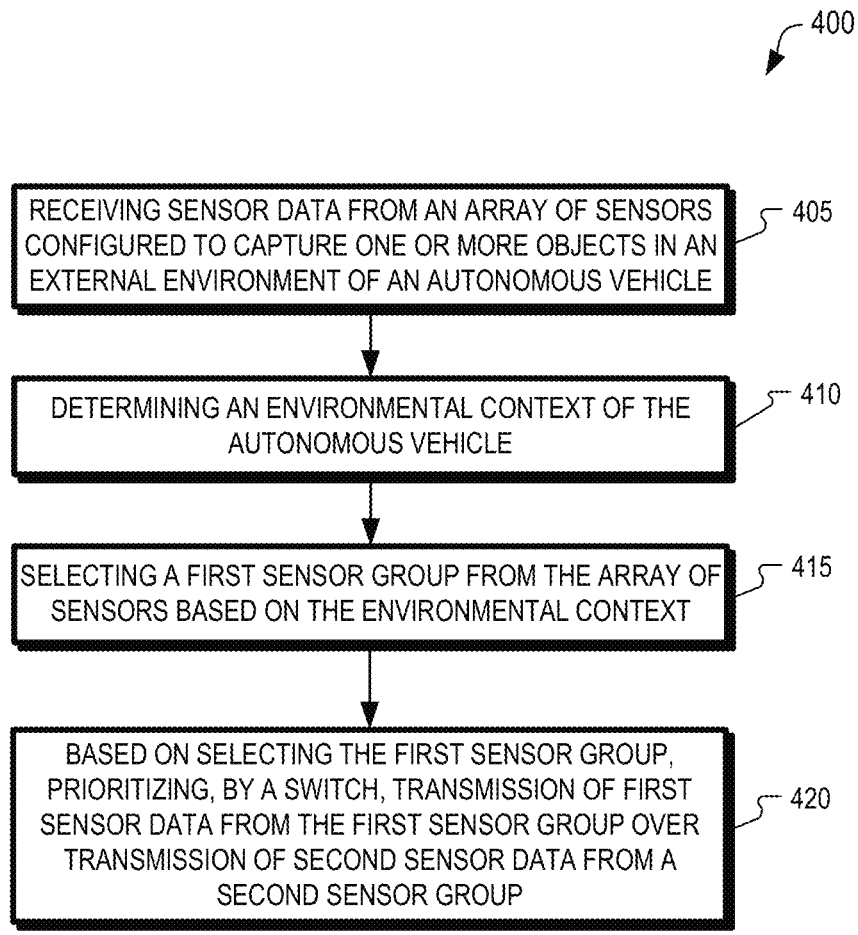
FIG. 4 illustrates a flow chart with an example process of prioritizing sensor data based on environmental conditions, in accordance with aspects of the disclosure.

FIG. 4 illustrates a flow chart with an example process 400 of prioritizing sensor data based on environmental conditions, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, sensor data from an array of sensors is received. The sensors in the array of sensors are configured to capture one or more objects of an external environment of an autonomous vehicle such as the sensors 133A-133I in FIG. 1B.

In process block 410, an environmental context of the autonomous vehicle is determined. In some implementations, the environmental context may be determined by the main processing logic solely based on the sensor data. For example, an autonomous vehicle may determine a snow conditions environmental context through image processing of images captured by cameras (e.g. camera array 261) of the autonomous vehicle. The autonomous vehicle may also determine a snow conditions environmental context by way of temperature gauges or precipitation sensors of the autonomous vehicle. In another example, a tunnel context may be determined through imaging processing of images captured by cameras (e.g. camera array 261) or LIDAR sensors of the autonomous vehicle. A tunnel may be determined by matching a GPS position of the autonomous vehicle with a known tunnel position on a digital traffic map, in some implementations.

In process block 415, a first sensor group is selected from the array of sensors of the autonomous vehicle based on the environmental context. The first sensor group may be a single sensor. In a tunnel environmental context, one or more LIDAR sensors may be selected as the first sensor group. In a snow conditions environmental context, one or more RADAR sensors may be selected as the first sensor group.

In process block 420, transmission of first data generated by the first sensor group is prioritized by a time sensitive network switch (e.g. time sensitive network switch 250)

based on selecting the first sensor group. Utilizing a time sensitive network switch may reduce delay in transferring sensor data so that the sensor data can be utilized to operate the autonomous vehicle to be responsive to objects that are detected by the sensors. A time sensitive network switch may time-stamp received sensor data before transferring the sensor data so that processing logic that assists in operating the autonomous vehicle is able to synthesize sensor data that was detected during a same time period. Transmission of the first data is prioritized, by the time sensitive network switch, over transmission of second sensor data generated by a second sensor group in the array of sensors. In FIG. 2, first sensor data 271 may be sent to main processing logic 205 prior to second sensor data 272, even when the first sensor data and the second sensor data are received by time sensitive network switch 250 at approximately the same time, for example. Main processing logic 205 may generate an external environment representation of the autonomous vehicle with the first sensor data. Previous sensor data and mapping data may also be utilized in generating the external environment representation. In some implementations, a switch that does not have all the characteristics of time sensitive network switch 250 may be utilized in place of the time sensitive network switch. For example, a switch may be utilized that does not time-stamp received sensor data.

Figure 5:
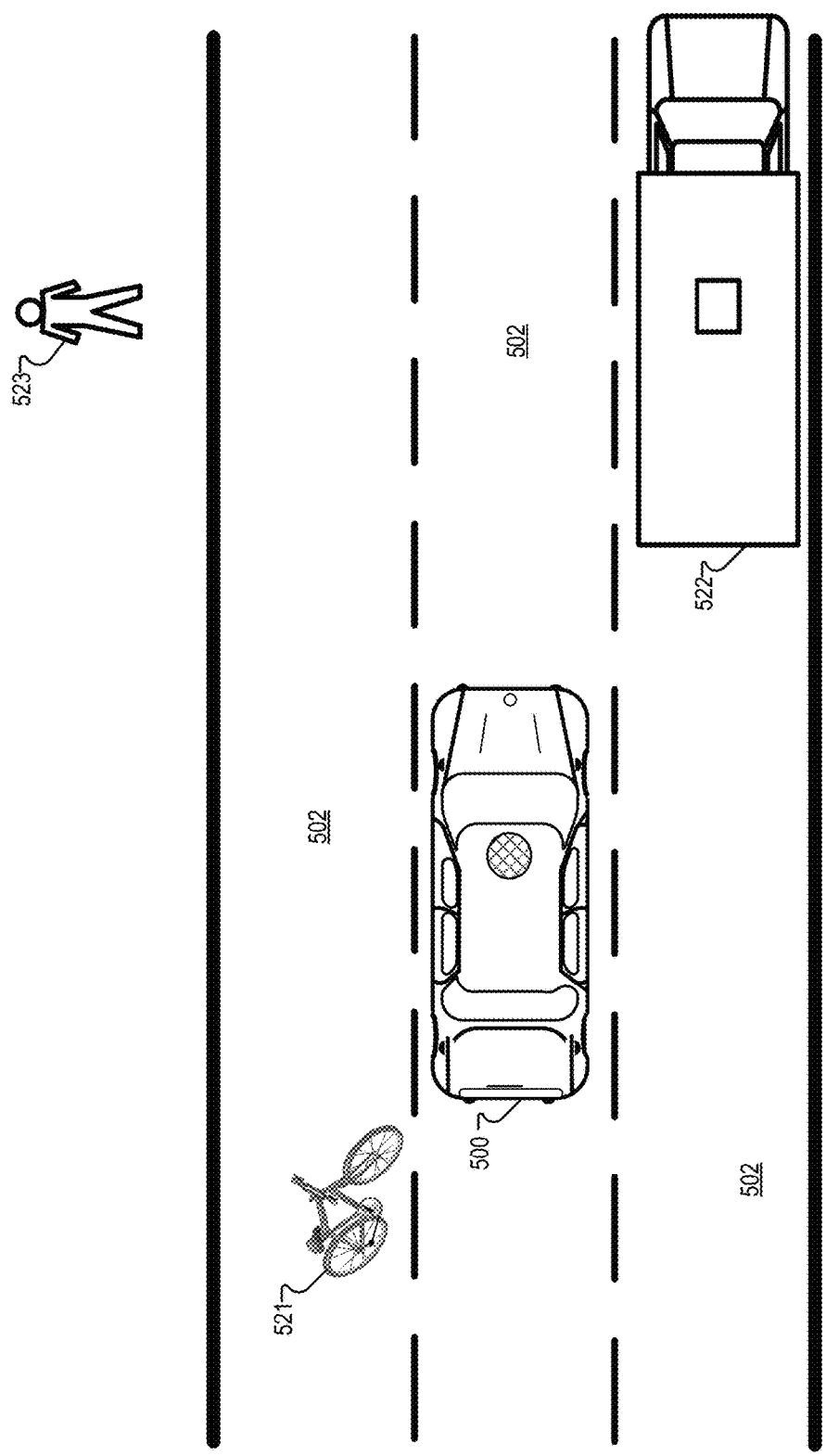
FIG. 5 illustrates an autonomous vehicle and other objects on a roadway, in accordance with aspects of the disclosure.

FIG. 5 illustrates an autonomous vehicle 500 and other objects on roadway 502, in accordance with aspects of the disclosure. FIG. 5 shows that autonomous vehicle 500 may encounter moving objects such as bicyclist 521, truck 522, and/or pedestrian 523. Certain sensors of autonomous vehicle 500 may be better configured to detect a particular object based on the proximity or orientation of the object to the vehicle. The sensors that are better configured to detect a particular object may be because of the position of the sensor on the vehicle or the sensor modality (e.g. image sensor, LIDAR, RADAR, ultrasonic). Additionally, certain sensors may be configured for near-field or far-field imaging such as image sensors optically paired with lenses of different focal lengths. Other sensors of the same type may also be configured for near-field or far-field imaging based on the wavelength or intensity of illumination light or the frequency or beam shape of transmitted radio waves. Ultrasonic sensors may be configured to detect objects in the near-field or far-field. Therefore, for any of these above reasons, certain sensor data generated by different sensors may be prioritized in accordance with implementations of the disclosure.

Figure 6:
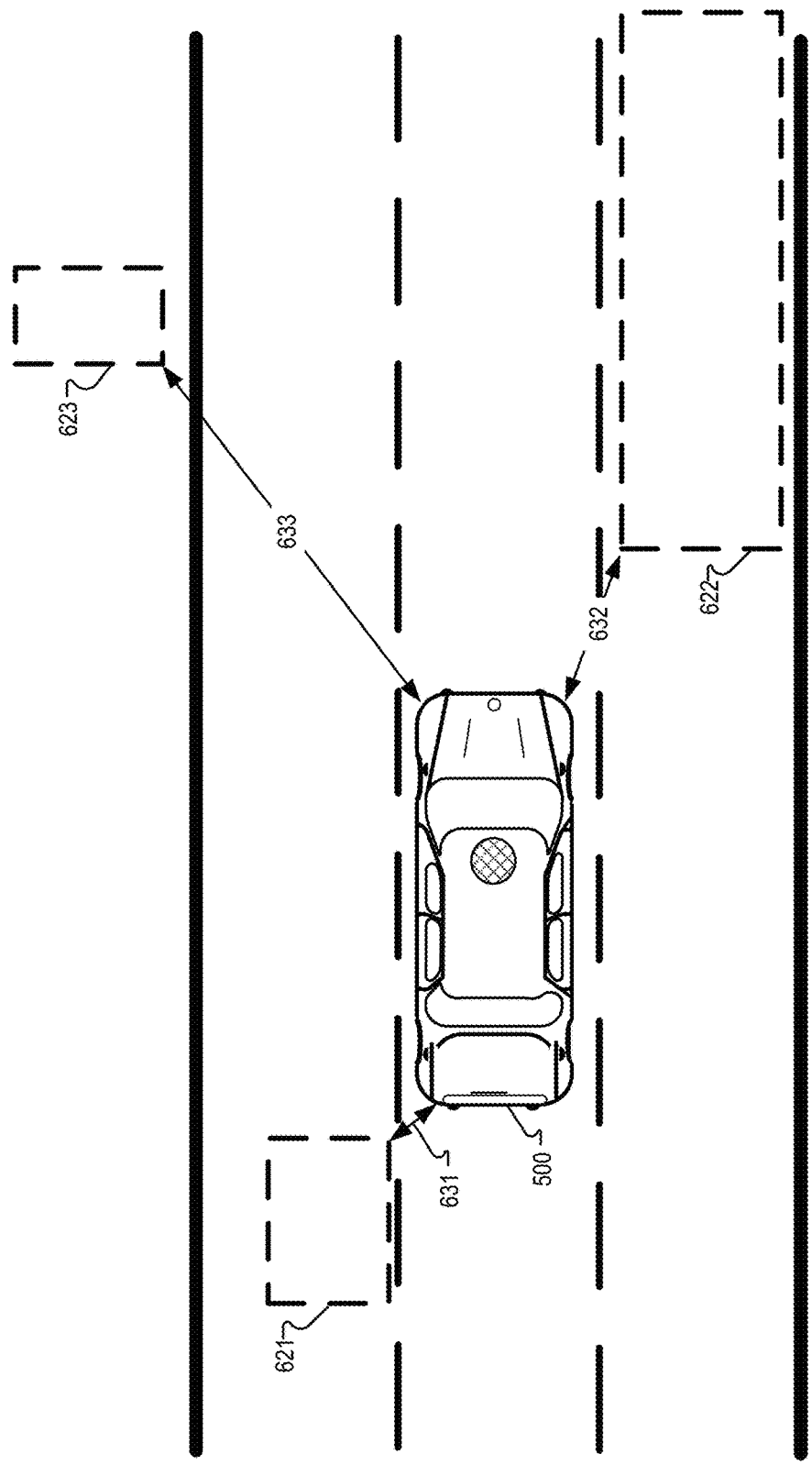
FIG. 6 illustrates that an autonomous vehicle may perceive a bicyclist, a truck, and a pedestrian as objects, in accordance with aspects of the disclosure.

FIG. 6 illustrates that the autonomous vehicle 500 may determine the bicyclist 521, the truck 522, and the pedestrian 523 are objects 621, 622, and 623, respectively. Proximity data 631 defines the spatial relationship between autonomous vehicle 500 and object 621. Similarly, proximity data 632 defines the spatial relationship between autonomous vehicle 500 and object 622 and proximity data 633 defines the spatial relationship between autonomous vehicle 500 and object 623. Bicyclist 521, truck 522, and pedestrian 523 may be determined as "objects" by main processing logic 205, for example, based on received sensor data. Yet, after bicyclist 521 is determined to be object 621, the close proximity 631 of object 621 to autonomous vehicle 500 may make it desirable for time sensitive network switch 250 to prioritize the sensors that are able to detect object 621. The proximity of objects 622 or 623 may also cause systems of autonomous vehicle 500 to prioritize sensors that are able to detect objects 622 or 623.

In some implementations, referring back to FIG. 2, main processing logic 205 may determine particular objects and generate proximity data defining the spatial relationship of the particular object to the autonomous vehicle 500. Main processing logic 205 may generate the proximity data based on the sensor data received from the array of sensors. Main processing logic 205 may send a prioritization message 274 to prioritization engine 253 that instructs prioritization engine 253 which sensors (and corresponding sensor data) to prioritize based on the proximity data of a particular object.

Figure 7:
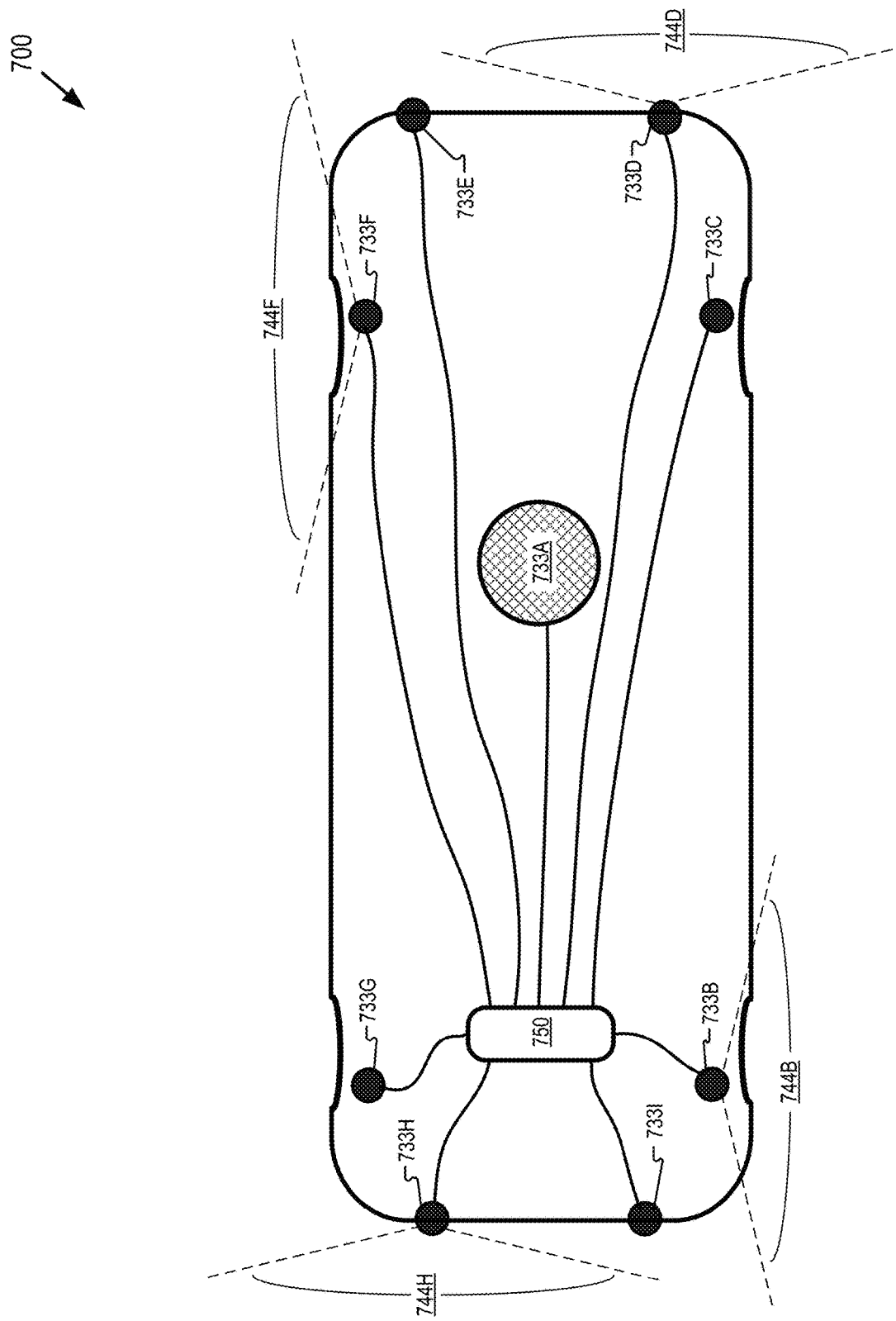
FIG. 7 illustrates sensors that provide sensor data may have different fields-of-imaging depending on a position of a sensor in an autonomous vehicle, in accordance with aspects of the disclosure.

FIG. 7 illustrates sensors 733A-733I that provide sensor data that may have different fields-of-imaging depending on a position of the sensor in autonomous vehicle 700, in accordance with aspects of the disclosure. Sensors 733A-733I are coupled to provide sensor data to time sensitive network switch 750. Time sensitive network switch 750 may be configured similarly to time sensitive network switch 250. FIG. 7 illustrates a total of nine sensors 733A-733I included in autonomous vehicle 700, although more sensors or fewer sensors may be used in other systems. Sensor 733B may be best positioned to detect objects proximate to the right-rear side of autonomous vehicle 700 that are in the field-of-imaging 744B of sensor 733B. The field-of-imaging 744B of sensor 733B may be 180 degrees or more. Similarly, sensor 733D may be best positioned to detect objects proximate to the right-front side of autonomous vehicle 700 that are in the field-of-imaging 744D of sensor 733D. Sensor 733F may be best positioned to detect objects proximate to the left-front side of autonomous vehicle 700 that are in the field-of-imaging 744F of sensor 733F. Sensor 733H may be best positioned to detect objects proximate to the left-rear side of autonomous vehicle 700 that are in the field-of-imaging 744H of sensor 733H. Of course, sensors 733C, 733D, 733G, and 733I are also configured to detect objects in their field-of-imaging (not illustrated) and Sensor 733A may have a 360 degree field-of-imaging when it is disposed on the top of autonomous vehicle 700.

Figure 8:
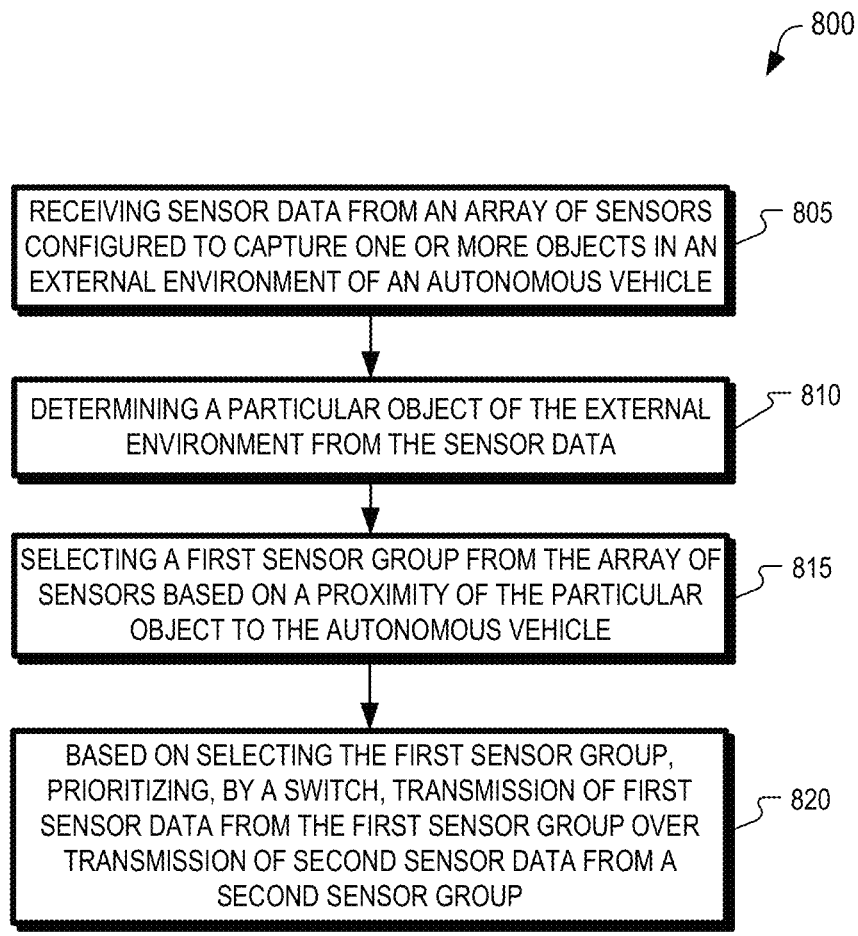
FIG. 8 illustrates a flow chart with an example process of prioritizing sensor data based on a proximity of an object to an autonomous vehicle, in accordance with aspects of the disclosure.

FIG. 8 illustrates a flow chart with an example process 800 of prioritizing sensor data based on a proximity of an object to an autonomous vehicle, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, sensor data from an array of sensors is received. The sensors in the array of sensors are configured to capture one or more images of an external environment of an autonomous vehicle such as the sensors 133A-133I in FIG. 1B.

In process block 810, a particular object of the external environment of the autonomous vehicle is determined from the sensor data. FIG. 6 illustrates that autonomous vehicle 500 may determine objects 621, 622, or 623 in the external environment of the autonomous vehicle, for example. For example, processing of sensor data may determine that an object exists with an perception module by analyzing the shape of an object or a speed of an object relative to the autonomous vehicle among other perceived attributes of the object, for example. The perception module may also determine objects by comparing the sensor data to mapping data to discern differences between mapping data and dynamic objects that are not included in the mapping data. Process block 810 may be performed by main processing logic 205, in some implementations.

In process block 815, a first sensor group is selected from the array of sensors of the autonomous vehicle based on the proximity of the particular object to the autonomous vehicle.

The first sensor group includes at least one sensor positioned to detect the particular object. The first sensor group may be a single sensor, in some implementations. The orientation and/or the distance of the object relative to the autonomous vehicle may determine which of the array of sensors is selected as the first sensor group. In some implementations, a distance value (e.g. meters from) of the particular object with respect to the autonomous vehicle may be determined and the sensors in the first sensor group may be selected based on that distance value. In some implementations, an orientation value (e.g. angle) of the particular object with respect to the autonomous vehicle may be determined and the sensors in the first sensor group may be selected based on that orientation value.

In process block 820, transmission of first sensor data generated by the first sensor group is prioritized by a time sensitive network switch (e.g., time sensitive network switch 250) based on selecting the first sensor group. Transmission of the first sensor data is prioritized, by the time sensitive network switch, over transmission of second sensor data generated by a second sensor group in the array of sensors. In FIG. 2, first sensor data 271 may be sent to main processing logic 205 prior to second sensor data 272, even when the first sensor data and the second sensor data are received by time sensitive network switch 250 at approximately the same time, for example. In some implementations, one or more processors may control a time sensitive network switch (e.g., time sensitive network switch 250) to prioritize particular sensor data. In some implementations, a switch that does not have all the characteristics of time sensitive network switch 250 may be utilized in place of the time sensitive network switch. For example, a switch may be utilized that does not time-stamp received sensor data.

To illustrate examples of process blocks 815 and 820, object 621 is in very close proximity 631 to autonomous vehicle 500 in FIG. 6 and sensors 733H and 733G may be selected to be in the first sensor group based at least in part on their position to detect object 621. Sensor 733A may also be selected if sensor 733A is configured to detect object 621. Accordingly, the first sensor data from sensors 733H and 733G (and sensor 733A if selected) is prioritized for transmission by the time sensitive network switch. The first sensor group may include sensors that are on a same side of the vehicle as the particular object, in some implementations.

In another example, the first sensor group is selected based at least in part on sensor modality. In one context, a LIDAR sensor or a camera may be better configured to image very near-field objects than a RADAR sensor. Therefore, the LIDAR sensor or camera may be selected into the prioritized first sensor group. When the particular object is located in the far-field, RADAR sensors may be selected to the first sensor group and prioritized over LIDAR sensors or camera sensors.

Some sensors of the same modality may provide better near-field imaging or far-field imaging. In one context, a first camera includes lenses having a shorter focal length than a second camera and the camera configured with the shorter focal length lens may be selected to image close proximity objects. Accordingly, the first camera may be included in the first sensor group when the particular object is in close proximity to the vehicle and the second camera may be included in the first sensor group when the particular object is not in close proximity to the vehicle.

In implementations of process 800, main processing logic 205 may generate an external environment representation of the autonomous vehicle with the first sensor data. The external environment representation may include mapping data and sensor data. Previous sensor data and mapping data may also be utilized in generating the external environment representation.

In some implementations, main processing logic 205 may include a data interface configured to send and receive data from high-speed data interface 207. Main processing logic 205 may also include a perception module to process the sensor data by analyzing the shape of an object or a speed of an object relative to the autonomous vehicle, for example. The perception module may classify identified objects into vehicles, pedestrians, or other categories by analyzing the portion of the sensor data for identifiable features of an object or matching the sensor data to known images of different objects to obtain a classification for the object. Main processing logic 205 may generate an external environment representation of the autonomous vehicle by overlaying the tracking locations of the tracked objects with the static bodies included in mapping. Based on the external environment representation, main processing logic 205 may send operation instruction to control system 210 of FIG. 2 by sending the operation instruction through high-speed data interface 207 and control interface 217 to control system 210. Control system 210 may then apply the operation instructions to control the autonomous vehicle 100.

The term "processing logic" (e.g. main processing logic 205 or processing logic 122) in this disclosure may include one or more processors, microprocessors, multi-core processors, and/or Field Programmable Gate Arrays (FPGAs) to execute operations disclosed herein. In some implementations, memories (not illustrated) are integrated into the processing logic to store instructions to execute operations and/or store data. Processing logic may include analog or digital circuitry to perform the operations disclosed herein.

Network 170 and/or 290 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors). For example, a machine-readable storage medium includes recordable/non-recordable media (e.g., read only memory (ROM), random access memory (RAM), magnetic disk storage media, optical storage media, flash memory devices).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. An autonomous vehicle comprising:
an array of sensors configured to generate sensor data related to one or more objects in an external environment of the autonomous vehicle;
a processor configured to determine an environmental context of the autonomous vehicle;
a control system;
a control system interface;
a data interface; and
a switch coupled between the array of sensors and the processor to transfer the sensor data from the array of sensors to the processor, wherein the switch includes an output port configured to transmit the sensor data to the processor through the data interface coupled between the processor and the switch, and wherein the control system interface is coupled between the control system and the switch, wherein the switch is configured to:
receive first sensor data from a first sensor group of the array of sensors;
receive second sensor data from a second sensor group of the array of sensors;
determine an order of transmission through the data interface of the first sensor data over the second sensor data in response to the environmental context; and
transmit the first sensor data to the processor through the data interface prior to transmitting the second sensor data based on the order of transmission,
wherein the processor is configured to transmit operation instructions to the control system through the data interface, the switch, and the control system interface, in that order, the operation instructions to adjust at least one of direction control, powertrain control, or brake control of the autonomous vehicle in response to the processor receiving the first sensor data, wherein the processor is further configured to generate a prioritization message based on a proximity of the one or more objects to the autonomous vehicle, wherein the switch is configured to receive the prioritization message based on the proximity of the one or more objects and to determine the order of transmission in response to the prioritization message.

2. The autonomous vehicle of claim 1, wherein the environmental context indicates one or more conditions surrounding the autonomous vehicle including a rain condition, a fog condition, a snow condition, or a road condition.

3. The autonomous vehicle of claim 1, wherein the processor is further configured to determine the environmental context in response to data obtained by at least one of a temperature gauge or a precipitation sensor of the autonomous vehicle.

4. The autonomous vehicle of claim 1, wherein the switch is further configured to time-stamp the sensor data before transferring the sensor data to the processor.

5. The autonomous vehicle of claim 1, wherein the environmental context indicates a snow condition, wherein the first sensor data includes RADAR sensor data received from one or more RADAR sensors of the array of sensors and wherein the second sensor data includes LIDAR sensor data received from one or more LIDAR sensors of the array of sensors.

6. The autonomous vehicle of claim 1, wherein the switch includes a prioritization engine, and wherein the prioritization message instructs the prioritization engine to prioritize the first sensor data or the second sensor data.

7. The autonomous vehicle of claim 1, wherein the processor is configured to send the prioritization message that indicates which of the sensor data for the switch to prioritize, and wherein the data interface coupled between the processor and the switch is configured to receive the prioritization message.

8. The autonomous vehicle of claim 7, wherein the first sensor data is generated by a first camera and the second sensor data is generated by a second camera, the first camera having a shorter focal length than the second camera, and wherein the first sensor data is prioritized based on proximity data of the one or more objects with respect to the autonomous vehicle, the proximity data being included in in the prioritization message.

9. An autonomous vehicle comprising:
an array of sensors configured to generate sensor data related to one or more objects in an external environment of the autonomous vehicle;
a processor configured to determine a tunnel context of the autonomous vehicle;
a data interface;
a control system;
a control system interface;
and
a switch coupled between the array of sensors and the processor to transfer the sensor data from the array of sensors to the processor, wherein the switch includes an output port configured to transmit the sensor data to the processor through the data interface coupled between the processor and the switch, and wherein the control system interface is coupled between the control system and the switch, wherein the switch is configured to:
receive first sensor data from a first sensor group of the array of sensors;
receive second sensor data from a second sensor group of the array of sensors;
determine an order of transmission through the data interface of the first sensor data over the second sensor data in response to the tunnel context; and
transmit the first sensor data to the processor through the data interface prior to transmitting the second sensor data based on the order of transmission,
wherein the processor is configured to transmit operation instructions to the control system through the data interface, the switch, and the control system interface, in that order, the operation instructions to adjust at least one of direction control, powertrain control, or brake control of the autonomous vehicle in response to the processor receiving the first sensor data, wherein the processor is further configured to generate a prioritization message based on the tunnel context, wherein the switch is configured to receive the prioritization message and to determine the order of transmission in response to the prioritization message.

10. The autonomous vehicle of claim 9, wherein the tunnel context indicates whether the autonomous vehicle is or will be located in a tunnel.

11. The autonomous vehicle of claim 10, further comprising:
one or more cameras configured to capture at least one image of the external environment, wherein the processor is further configured to perform image processing of the at least one image to determine the tunnel context.

12. The autonomous vehicle of claim 10, further comprising:
one or more LIDAR sensors configured to generate a plurality of cloud points related to the external environment, wherein the processor is further configured to determine the tunnel context in response to the plurality of cloud points.

13. The autonomous vehicle of claim 10, further comprising:
one or more RADAR sensors configured to generate a plurality of cloud points related to the external environment, wherein the processor is further configured to determine the tunnel context in response to the plurality of cloud points.

14. The autonomous vehicle of claim 10, wherein the processor is further configured to determine the tunnel context in response to matching a GPS position of the autonomous vehicle with a known tunnel position.

15. The autonomous vehicle of claim 9, wherein the tunnel context indicates that the autonomous vehicle is located in a tunnel, wherein the first sensor data includes LIDAR sensor data received from one or more LIDAR sensors of the array of sensors and wherein the second sensor data includes RADAR sensor data received from one or more RADAR sensors of the array of sensors.

16. The autonomous vehicle of claim 9, wherein the processor is configured to send the prioritization message that indicates which of the sensor data for the switch to prioritize, and wherein the data interface coupled between the processor and the switch is configured to receive the prioritization message.

17. A method performed by a switch system of an autonomous vehicle, the method comprising:
receiving, with a switch, a prioritization message that is based on a tunnel context determined by a processor of the autonomous vehicle, wherein the prioritization message is received over a data interface coupled between the switch and the processor;
receiving, with the switch, first sensor data from a first sensor group of the autonomous vehicle;
receiving, with the switch, second sensor data from a second sensor group of the autonomous vehicle, wherein the first sensor data and the second sensor data are related to one or more objects in an external environment of the autonomous vehicle;
determining, with the switch, an order of transmission through the data interface of the first sensor data over the second sensor data in response to the prioritization message that indicates which sensors and corresponding sensor data for the switch to prioritize;
transmitting, with the switch, the first sensor data to the processor over the data interface prior to transmitting the second sensor data based on the order of transmission determined by the switch, wherein the first sensor data is for at least one of direction control, powertrain control, or brake control of the autonomous vehicle; and
in response to the processor receiving the first sensor data, transmitting, with the processor, operation instructions to a control system through the data interface, the switch, and a control interface, in that order, the operation instruction to adjust at least one of a direction control, powertrain control, or brake control of the autonomous vehicle.

18. The method of claim 17, wherein the tunnel context indicates whether the autonomous vehicle is or will be located in a tunnel.

* * * * *